Sept. 4, 1951        H. V. REED        2,566,374
CLUTCH LEVER MOUNTING
Filed April 13, 1948        2 Sheets—Sheet 1
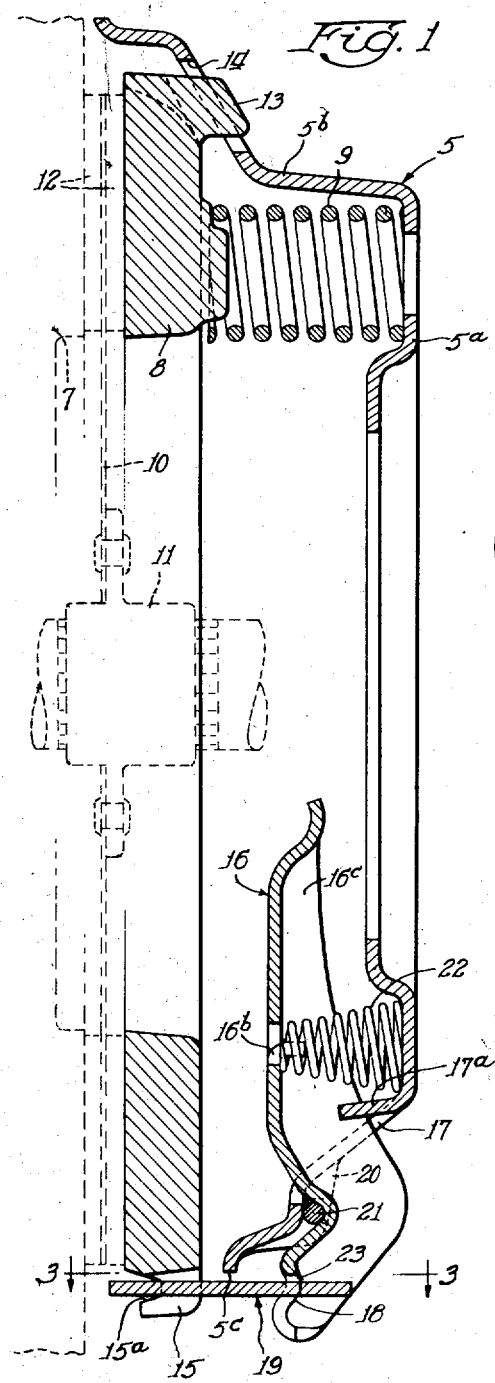
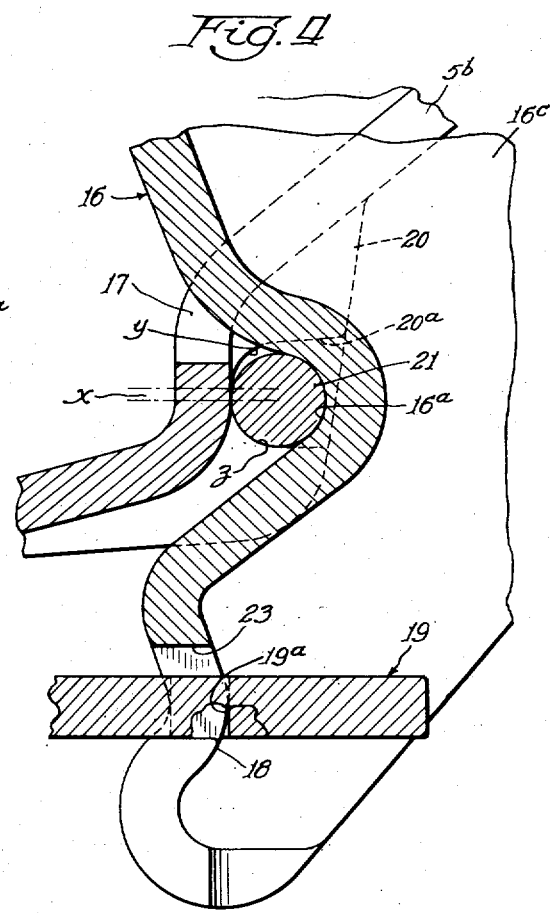
Inventor:
Harold V. Reed Sept. 4, 1951  H. V. REED  2,566,374
CLUTCH LEVER MOUNTING
Filed April 13, 1948  2 Sheets-Sheet 2
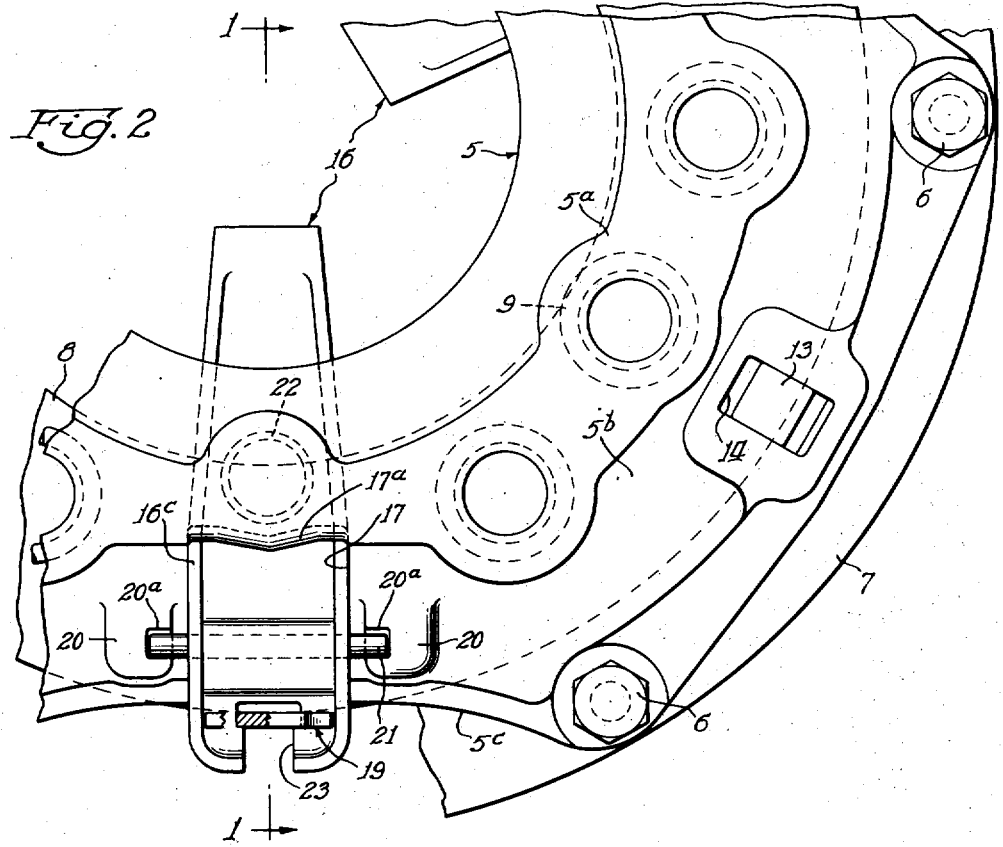
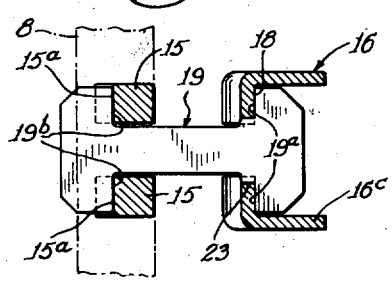
Inventor:
Harold V. Reed Patented Sept. 4, 1951

2,566,374

UNITED STATES PATENT OFFICE 2,566,374

CLUTCH LEVER MOUNTING

Harold V. Reed, Chicago, Ill., assignor to Borg-Warner Corporation, Chicago, Ill., a corporation of Illinois Application April 13, 1948, Serial No. 20,651

5 Claims. (Cl. 192—99)

This invention relates to improvements in the friction clutches and more specifically to an improved release lever mounting or assembly for the clutch.

One of the principal objects of the present invention is to simplify the construction of a release lever mount or assembly for clutches such as contemplated herein, and to improve the efficiency and operation of such assembly.

An important feature of this invention is to provide a friction clutch with an improved lever release and operating assembly having therein a novel anti-friction action between the lever and clutch cover.

Another object hereof is to provide a clutch lever assembly that is so constructed and arranged that a rolling or rocking contact is effected between the movable lever and the cover thereby to reduce wear by minimizing friction which may be created between such relatively movable parts. An additional advantage of such arrangement resides in the fact that there is a reduction in the amount of force required to manually operate the members by which the clutch is released.

A further object of the present invention is to provide a novel anti-friction lever mount for a clutch which permits the lever to be arranged within the cover so that its radially outer region passes through an opening in the side wall of the clutch cover whereby a rolling or rocking action takes place at the lever fulcrum which is adjacent the margin of the cover opening. This provides for a reduction of the overall axial dimension of the clutch assembly and permits a closer or more compact coupling of the component parts of the assembly.

Additional objects, aims, and advantages of the invention contemplated herein will be apparent to persons skilled in the art after the construction and operation of the lever mount assembly is understood from the within description. It is preferred to accomplish the numerous objects of this invention, and to practice the same, in substantially the manner hereinafter fully described and as more particularly pointed out in the appended claims, reference being made to the accompanying drawings which form a part of this specification.

In the drawings:

Fig. 1 is a vertical sectional view of a friction clutch, such as used for motor vehicles, and constructed in accordance with a typical form of this invention;

Fig. 2 is a fragmentary rear elevation of the assembly shown in Fig. 1;

Fig. 3 is an enlarged sectional detail taken along the plane of line 3—3 of Fig. 1, showing details of the lever assembly;

Fig. 4 is a greatly enlarged view of a portion of the lever and adjacent region of the cover to show details which may not be apparent in the other figures.

The drawings are to be understood as being more or less of a diagrammatic character for the purpose of disclosing a typical or preferred form of the improvements contemplated herein, and in these drawings like reference characters identify the same parts in the different views.

The clutch assembly which has been selected for illustration herein is a friction clutch of the type generally used in motor vehicles for effecting a coupling of the engine crank-shaft and the transmission shaft of the vehicle. A clutch assembly of this character preferably comprises a stamped sheet metal cover 5 of dished form which is attached, at its peripheral margin by bolts 6, to the flywheel 7 of the engine crank shaft. Also there is an annular ring-like pressure plate 8 arranged within said cover and adapted to be normally urged toward the flywheel 7 by a plurality of clutch packing springs 9 which are interposed between said pressure plate and the radial rear wall 5a of the cover plate. A clutch driven disc 10 has its hub 11 splined to the driven transmission shaft (not shown) and its outer region extends radially outward between the pressure plate 8 and the opposing face of flywheel 7 where it supports annular friction facings 12 which are adapted for relative axial yieldability when being compressed between the pressure plate and flywheel face by the packing springs 9, as when the clutch is engaged.

Ears 13 on the periphery of pressure plate 8 are projected therefrom through suitable apertures 14 formed in the adjacent side wall 5b of the cover plate 5. These ears and apertures are so arranged that they effect a driving connection between the pressure plate and the cover but will permit independent axial movement of the pressure plate in directions toward and away from the flywheel 7 and driven disc 10. Thus, the driving connection between the cover plate and pressure plate is such that these parts are caused to rotate with the flywheel and the pressure plate may be independently shifted to engage or release the clutch. In the regions of the pressure plate between the ears 13 there are bifurcated radial lugs 15 of hook-shape which project through arched portions 5c in the side wall 5b of the cover plate which lie radially outward from lever openings 17, there being preferably three of such lugs, one for each release lever assembly which will be hereinafter described.

It will be apparent from the foregoing description and the accompanying drawings that there may be a plurality, preferably three, release lever assemblies arranged with the levers 16 positioned radial to the axis of the pressure plate. For the sake of brevity, as well as convenience in describing these lever assemblies, the construction and arrangement of a single assembly will be explained.

The lever 16 is preferably a sheet metal stamping which has been suitably heat-treated for hardening. By reference to Fig. 1, it will be seen that the major portion or radial inner region of the lever is located within the cover 5, while the remaining outer portion or foot projects through an opening 17 in the side wall 5b of the cover. In longitudinal section the foot has an S-shape which provides a convex or rounded contact surface at 18 which is engaged by a flat edge 19a of a force transmitting floating link 19 having a generally H-shape. Another edge 19b of this link is engaged in a notch or seat 15a in the front face of the pressure plate lug 15. Thus the foot of the lever is coupled with the pressure plate and a rocking fulcrum movement is effected between the lever foot and the link when the lever is operated.

By reason of this arrangement, when the inner end of lever 16 is engaged by the usual shift or thrust collar (not shown) to move said end forward towards the flywheel, the foot will move rearward and pull the pressure plate in a direction axially away from the flywheel thereby releasing the clutch driving members from the driven friction disc 10 by compressing the packing springs 9.

The side wall 5b of the cover surrounding the opening 17 is frusto-conical in shape so that it inclines radially inwardly and rearwardly toward the rear wall 5a, and at said opening 17 said wall has a stepped region at 20 which is preferably formed with circumferentially spaced sockets or notches as shown for receiving a pivot roller or pin 21 on which the lever fulcrums. Opposite this socket the lever has a seat 16a which may conform with the contour of fulcrum pin 21 so that said seat surrounds a considerable surface of said pin.

The dimensions and shape of this socket means are of importance in the present assembly, and in order to clearly emphasize the features thereof reference is made to the enlarged schematic arrangement shown in Fig. 4. It will be seen this socket has a central or intermediate flat region $x$ which is located between the two arcuately curved retainer end regions $y$ and $z$. When the fulcrum pin 21 is inactive, as when lever 16 is in the clutch engaged position shown in Fig. 4, said pin will have a line contact with the sockets at the outer edge of the flat region $x$ while a portion of the circumference of said pin 21 may rest against the radial outward retainer region $z$ of the socket. A swinging movement of lever 16 to release the clutch causes the pin 21 to rock or roll, without friction, radially inward and in so doing, said pin will travel radially inward across the flat region $x$ until it is engaged against the radial inward retainer region $y$ of the socket. Thereafter, further swinging movement of lever 16 will be a pivoting movement of the lever on pin 21 by reason of the fact that the bodily travel of said pin has been arrested. Intentionally, the radial dimension between the portions $y$ and $z$ of the socket or notch means 20a is only slightly greater than the diameter of the pin 21 thereby providing a minimum of clearance between these parts, and hence limiting the amount of rolling travel of the pin on the cover. Experimentation and tests have shown that this clearance in the present lever mounting arrangement successfully prevents excessive annular or twisting movement of the inner region of the lever. This is of definite advantage since there is a certain force, due to the drag of the clutch throw-out, tending to move the inner end of the lever in an annular direction to such an extent that the lever flanges 16a will bear too firmly against the sides of the opening 17 in the cover thereby creating considerable friction.

It will be seen that the arrangement of the lever and its fulcrum is such that, during the above explained cycle of movement, a rocking or rolling movement is effected between the flat edge 19a of the link and the convex surface 18 of the foot due to the fact that the lever foot will have swung radially inward.

Yieldable means, which may take the form of a coiled expansion spring 22 is interposed between the inner portion or body of lever 16 and the rear wall 5a of the cover for urging the inner end of said lever forward towards the flywheel and thereby retain the link 19 in assembly with the lever foot and the pressure plate lug 15. A stub 16b, stamped out from the body of lever 16 enters the adjacent end of spring 22 to hold said spring engaged with the lever. Also a tongue 17a bent inward from an edge of cover opening 17 in a position that is radially outward or alongside the adjacent end of spring 22 prevents radial movement or dislodgement of said spring due to centrifugal force when the clutch assembly is rotated. There is ample clearance between this tongue and the reinforcing side flanges 16c of the lever so that there is no interference with the operation of said lever. As before stated, the link has an H-shape which permits the sidewise insertion of its body portion or cross-piece into an open T-shaped recess or key-slot 23 at the outer end of lever 16, while the opposite end of said cross-piece is placed in the gap of the bifurcated lug 15.

From the foregoing it is apparent that the mounting structure for the release levers of a clutch and connection of the foot portions of said levers to the pressure plate, whereby rocking actions are effected between the relatively movable parts, is not only simply and compactly constructed for economy of space, but also requires a minimum of manual effort to release the clutch.

While this invention has been described in detail in its present preferred form or embodiment, it will be apparent to persons skilled in the art, after understanding the improvements, that various changes and modifications may be made therein without departing from the spirit or scope thereof. It is aimed in the appended claims to cover all such changes and modifications.

What is claimed is:

1. In a friction clutch, a dished cover having a forwardly extending side wall for attachment to a driving element, said side wall having an opening therein and the region radially outward from said opening being arched away from the driving element; a spring-packed pressure plate within said cover; a clutch release lever having longitudinal side flanges and arranged with its major portion between said pressure plate and cover and with its flanges close to the sides of said cover opening; a foot portion on said lever projecting radially outside said cover through said opening; a curved region bulging rearwardly away from said cover on said foot portion; a lug on said pressure plate projecting through said cover arched region and having a recess therein; a force-transmitting link extending from said pressure plate lug through said cover arched region, said link having a first edge seated in said lug recess and having a second edge in line contact with said curved foot region of the lever for effecting a rolling fulcrum movement of said lever with respect to said link; seats integral with said cover defined by an inwardly notched region in said cover side wall at each radial side of said opening; a pin cooperatively associated with said seats and with the forward inner surface of said curved region of the lever foot, said pin spanning said opening and having limited rolling contact with said seats to fulcrum said lever; a coiled expansion spring interposed between said cover and the radially inner portion of said lever; a stub on said lever between the flanges thereof and entered in said spring; and a tongue projecting inward from said cover at a location radially outward from said spring, said stub and tongue defining restraining means to maintain said spring against dislodgement, and the inner region of said tongue lying between the flanges of said release lever for preventing sidewise movement of said lever.

2. In a friction clutch, a dished cover having a forwardly extending side wall, said side wall for attachment to a driving element having an opening therein and the region radially outward from said opening being arched away from the driving element; a spring-packed pressure plate within said cover; a clutch release lever having longitudinal side flanges and arranged with its major portion between said pressure plate and cover and with its flanges close to the sides of said cover opening; a foot portion on said lever projecting radially outward through said opening and having a rearwardly curved region; a lug on said pressure plate projecting through said cover arched region and having a recess therein; a force-transmitting link extending from said pressure plate lug through said cover arched region, the rear portion of said link lying between said lever flanges, said link having a first edge seated in said lug recess and having a second edge in line contact with said curved foot region of the lever for effecting a rolling fulcrum movement of said lever with respect to said link; seats defined by an inwardly notched region in said cover side wall at each radial side of said opening, the ends of said notched regions defining abutments; an elongate pin in said seats in cooperative association with the forward inner surface of said curved region of the lever foot and in spanning relation to said opening, said pin being restrained against longitudinal movement by said abutments and having limited rolling contact with said seats to fulcrum said lever; a coiled expansion spring interposed between said cover and the radially inner portion of said lever; a stub on said lever between the flanges thereof and entered in said spring; and a tongue projecting inward from said cover at a location radially outward from said spring, said stub and tongue defining restraining means to maintain said spring against dislodgement, and the inner region of said tongue lying between the flanges of said release lever for preventing sidewise movement of said lever.

3. In a friction clutch, a dished cover having an opening in its side wall; a spring-packed pressure plate within said cover; a clutch release lever having its major portion within said cover, and having an outer foot portion projecting through said cover opening to the exterior thereof; a curved region bulging rearwardly on said lever foot; a lug adjacent the outer peripheral region of said pressure plate; a force-transmitting link extending axially and wholly outside said cover, said link having a first edge engaged with the forward face of said lug, and having a second edge engaged by said curved foot region for effecting rolling fulcrum movement of said foot region on said second edge; inwardly notched regions in the side wall of said cover defining seats on the outer surface of said cover at the sides of said release lever, the end walls of said notched regions providing abutments; and a fulcrum pin the ends of which have limited rolling contact with said seats and its intermediate portion bridging said cover opening, said pin being restrained against longitudinal movement by said abutments, said pin being engaged by the inner surface of said curved region of the lever foot thereby to fulcrum said release lever.

4. In a friction clutch, a dished cover having an opening in its side wall; a spring-packed pressure plate within said cover; a clutch release lever having its major portion within said cover, and having an outer foot portion projecting through said cover opening to the exterior thereof; a curved region bulging rearwardly on said lever foot; a radial lug adjacent the outer peripheral region of said pressure plate and having a recess in its forward face; a force-transmitting link extending axially and wholly outside said cover, said link having a first edge engaged with said lug recess, and having a second edge engaged by said curved foot region for effecting rolling fulcrum movement of said foot region on said second edge; inwardly notched regions in the side wall of said cover defining integral seats on the outer surface of said cover at the sides of said release lever, the end walls of said notched regions providing abutments; a fulcrum pin the ends of which have limited rolling contact with said seats and with its intermediate portion bridging said cover opening, said pin being restrained against longitudinal movement by said abutments, said pin being engaged by the inner surface of said curved region of the lever foot thereby to fulcrum said release lever; spring means engaged with said cover and the inner portion of said lever for urging said lever portion towards said pressure plate; and members projecting axially towards each other on said cover and said inner portion of said lever and defining means for restraining said spring means against dislodgement.

5. In a friction clutch, a sheet metal cover having a forwardly extending side wall which is particularly characterized by having an opening therein, and having well-defined inwardly notched regions providing spaced seats adjacent the sides of said opening, the ends of such notched regions providing abutments; a fulcrum pin at least the end regions of which have limited rolling movement in said seats, said pin having its intermediate portion bridging said opening and being restrained against longitudinal movement in said seats by said abutments, a spring-packed pressure plate within said cover having a radial lug with a recess in its forward side; a sheet metal release lever having its major portion within said cover, and having an outer foot portion projecting through said opening and fulcrumed on said pin, said lever having longitudinal side flanges adjacent the radial edges of said opening for guiding said lever and preventing sidewise movement thereof; a concavo-convex region formed in said foot at a location radially outward from said pin and bulging in a rearward direction; and an axially extending force-transmitting floating link wholly outside said cover, said link having a forward edge engaged in said lug recess, and having a rearward edge engaged by the convex face of said bulged foot region for effecting rolling fulcrum movement of the lever foot with respect to said link.

HAROLD V. REED.

REFERENCES CITED

The following references are of record in the file of this patent:

UNITED STATES PATENTS

| Number | Name | Date |
|---|---|---|
| 1,717,534 | Wemp | June 18, 1929 |
| 1,787,160 | Moorhouse | Dec. 30, 1930 |
| 1,881,127 | Paton et al. | Oct. 4, 1932 |
| 2,002,943 | Hartley | May 28, 1935 |
| 2,082,655 | Reed | June 1, 1937 |
| 2,101,293 | Reed | Dec. 7, 1937 |
| 2,325,193 | Nutt et al. | July 27, 1943 |
| 2,417,035 | Ziedler | Mar. 4, 1947 |

Certificate of Correction

Patent No. 2,566,374 September 4, 1951

HAROLD V. REED

It is hereby certified that error appears in the printed specification of the above numbered patent requiring correction as follows:

Column 5, line 32, for "extending side wall, said side wall" read *extending side wall for attachment to a driving element,*; line 33, strike out "for attachment to a driving element" and insert instead *said side wall*;

and that the said Letters Patent should be read as corrected above, so that the same may conform to the record of the case in the Patent Office.

Signed and sealed this 12th day of February, A. D. 1952.

[SEAL]

THOMAS F. MURPHY,
*Assistant Commissioner of Patents.*